April 15, 1930. E. J. GALLAGHER, JR 1,755,059
WINDSHIELD WIPER
Filed Feb. 21, 1929 2 Sheets-Sheet 1
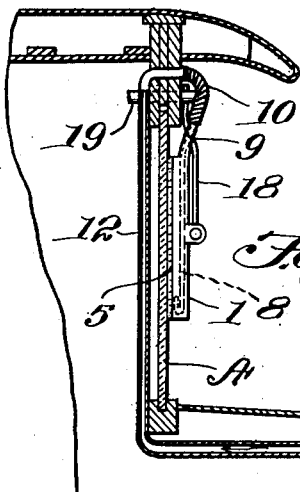
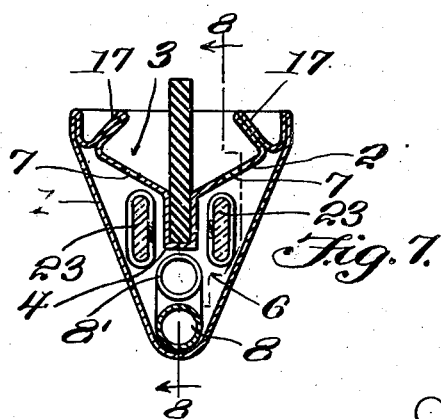
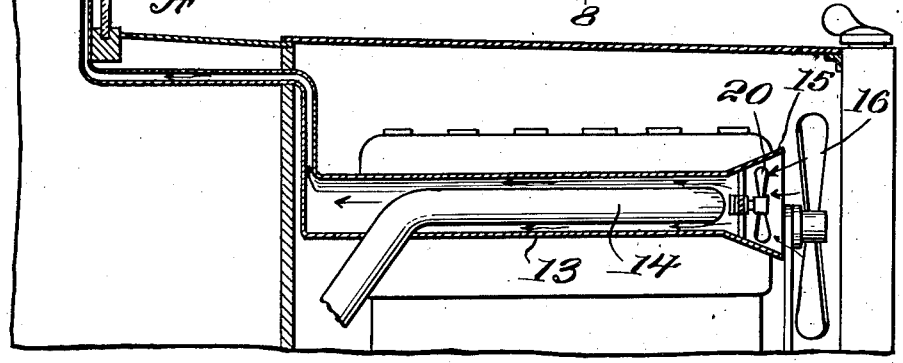
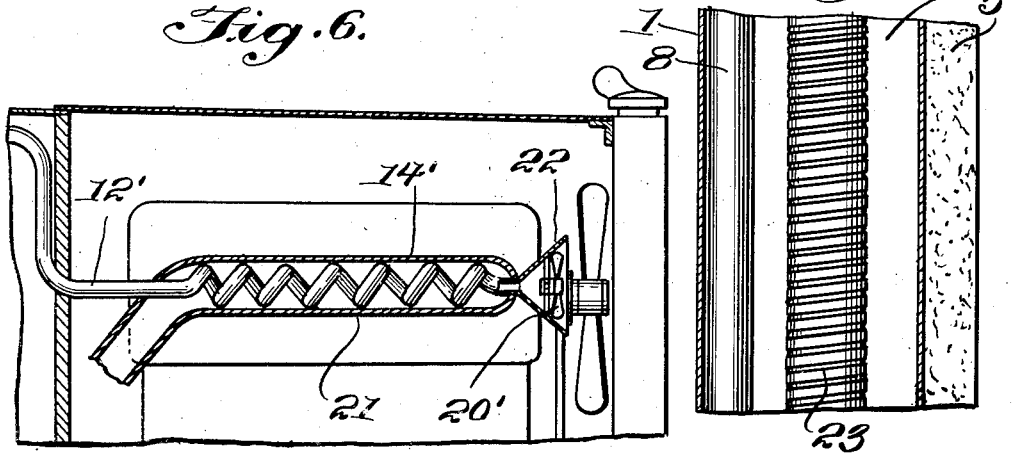
Edward J. Gallagher Jr.
INVENTOR
BY Victor J. Evans
ATTORNEY
WITNESS: J. T. L. Wright

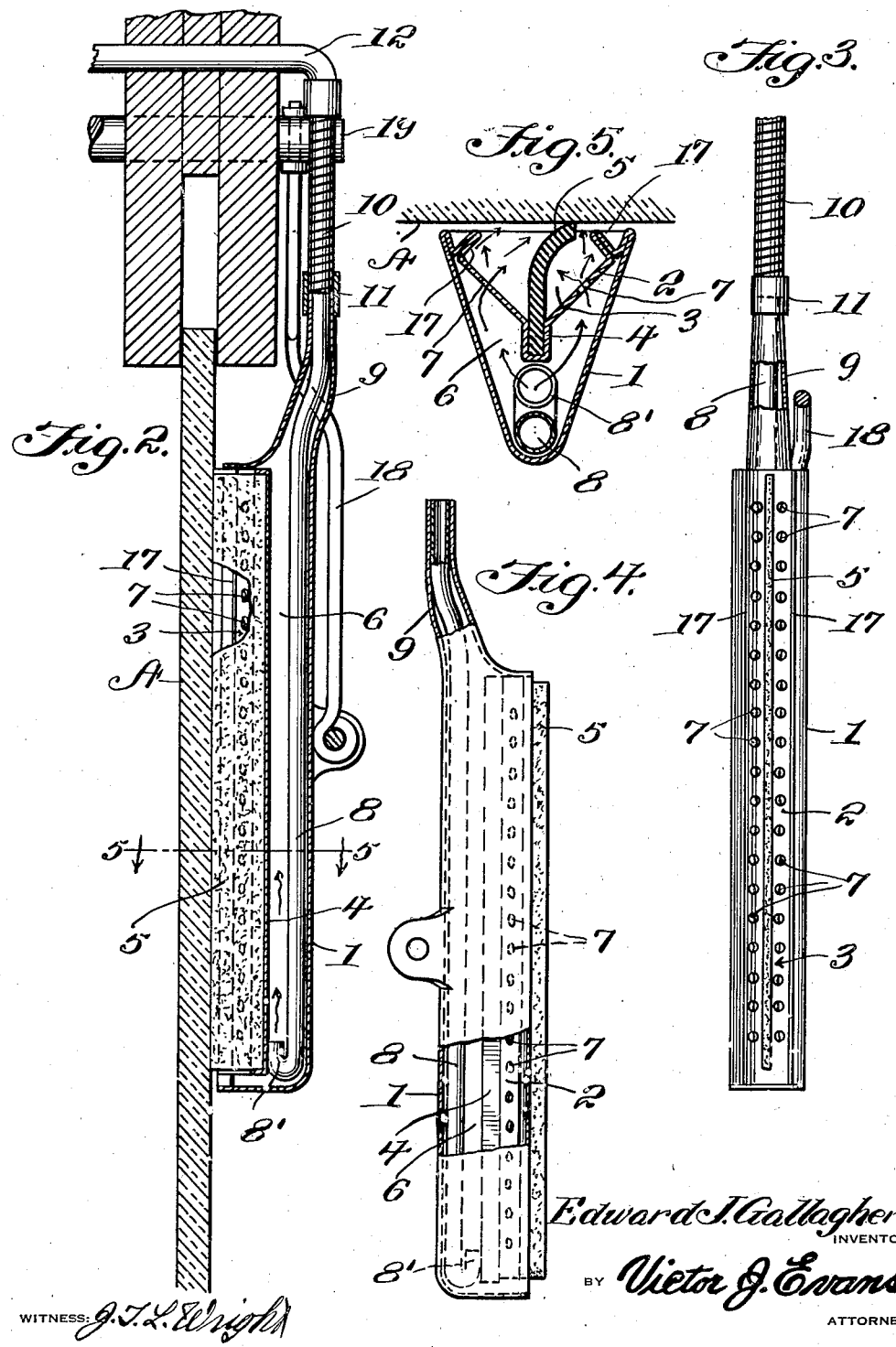

Patented Apr. 15, 1930

1,755,059

UNITED STATES PATENT OFFICE

EDWARD J. GALLAGHER, JR., OF BALTIMORE, MARYLAND

WINDSHIELD WIPER

Application filed February 21, 1929. Serial No. 341,733.

This invention relates to a windshield wiper for use on motor vehicles, boats, aircrafts, railroad trains, street cars, etc., the general object of the invention being to provide a housing having a chamber therein which has an opening arranged close to the transparent member which is to be wiped and through which chamber the wiper element passes, with means for forcing heated air into the chamber whereby the transparent member will be heated as the device passes back and forth over the same during the wiping action, so that ice, snow, moisture and the like will be removed from the transparent member and thus afford perfect vision to the operator.

Another object of the invention is to provide a stove which is heated from the heat generated by the motor or other element of the vehicle and through which air is caused to pass, with means for conducting this air to the chamber of the wiper device.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary sectional view of a motor vehicle, showing the invention in use thereon.

Figure 2 is a longitudinal sectional view through the windshield part of a vehicle and through portions of the wiper device.

Figure 3 is a view partly in section, looking into the device.

Figure 4 is a side view, with parts in section.

Figure 5 is a section on line 5—5 of Figure 2.

Figure 6 is a fragmentary sectional view through a motor vehicle and showing a different form of air heating means from that shown in Figure 1.

Figure 7 is a sectional view through the wiper device, showing a slight modification.

Figure 8 is a section on line 8—8 of Figure 7.

In these drawings, the numeral 1 indicates a housing which forms the body of the wiper device, the wall 2, which is adjacent the transparent member A, being of substantially V shape and extending into the housing so as to form a chamber 3 between the housing and the transparent member when the device is in use. The central part of the wall 2 is formed with a channel 4 to receive an edge of the wiper strip 5. The side walls of the body converge from the edges of the wall 2 and these sides and the wall 2 form a chamber 6 which is in communication with the chamber 3 through the perforations 7 formed in the walls 2, intermediate their ends. A pipe 8 is arranged in the small part of the chamber 6 and has its lower end bent upwardly, as shown at 8', with its upper end passing into a restricted neck portion 9 at the upper end of the housing, the pipe being suitably secured to portions of the housing. A flexible tube 10 is connected with the extremity of the neck part 9 by a coupling 11, and this flexible tube is in communication with the upper end of the pipe 8 and pipes 12 connect the upper end of the tube 10 with a stove 13 which surrounds the exhaust manifold 14 of the motor of the vehicle on which the device is used. The front end of the stove is provided with a flaring mouth 15 and is located in rear of the fan 16 at the front of the motor so that some of the air from this fan will pass into the flaring mouth through the stove, where it is heated by the gases passing through the exhaust manifold, and then the heated air will pass through the pipes 12 and tube 10 into the pipe 8, from which it will escape through the bent end 8' and thus enter the chamber 6 of the housing and then the air will pass through the perforations 7 into the chamber 3, where it will contact the transparent member A and thus melt ice and snow thereon and dry moisture on the transparent member as the same is being wiped by the strip 5. Baffles 17 are connected with the wall 2 for directing the air currents inwardly toward the strip 5 and against the transparent member.

The housing is connected by the usual arm 18 with the shaft 19 of the operating device, which may be a motor or hand operated device.

A fan 20 is placed in the mouth 15 of the stove to accelerate the passage of the air into the same.

Instead of forming the stove as shown in Figure 1, I may place a coil 21 in the manifold 14' and connect a funnel 22 to the front end of the coil, said funnel being arranged to receive some of the air from the fan of the motor so that this air will pass through the coil and thus be heated by the exhaust gases in the manifold. The rear end of the coil is connected by the pipes 12' with the housing of the wiper device. A small fan 20' is also placed in the funnel to accelerate the passage of air through the stove or heating device.

I may also place electric heating elements 23 in the chamber 6 of the housing to additionally heat the air passing through the device, the coils of these elements being connected to a suitable source of current.

From the foregoing it will be seen that I have provided simple means for supplying heated air to a wiper device, with means associated with the device for directing the air against the transparent member being wiped so that ice, snow and moisture will be quickly and easily removed from the transparent member during the operation of the wiper device, thus affording clear vision to the driver or occupants of the vehicle in all sorts of weather. It will, of course, be understood that one of these devices can be so placed as to engage the inner face of the windshield or other transparent member, if desired.

By making the housing of the shape shown, the air currents produced by the movement of the vehicle will be deflected by the inclined walls of the housing outwardly away from the rear end of the device and thus be prevented from entering the device and cooling the heated air therein.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A wiper device of the class described comprising a housing having a chamber with an open side, the open side being arranged adjacent the transparent member to be wiped, a wiper strip carried by the housing and arranged in and projecting from the opening in the chamber and dividing the chamber into two parts, means for supplying heated air to the chamber and means for moving the device over a surface to be cleaned.

2. A wiper device of the class described comprising a housing having a chamber with an open side, the open side being arranged adjacent the transparent member to be wiped, a wiper strip carried by the housing and arranged in and projecting from the opening in the chamber and dividing the chamber into two parts, means for supplying heated air to the chamber, baffles connected with the walls of the chamber for directing the air toward the strip and against the transparent member and means for moving the device over a surface to be wiped.

3. A wiper device of the class described comprising a housing having a wall arranged adjacent the transparent member to be wiped, extending inwardly into the housing, whereby an open chamber will be formed by said wall between itself and the transparent member and a second chamber will be formed by said wall and the rest of the housing, said wall having perforations therein, the central portion of the wall being of channel shape, a wiper strip having one edge held in the channel part, with the strip passing through the chamber and engaging the transparent member, a pipe extending into the second chamber and means for connecting said pipe with a supply of heated air whereby the air will enter the second chamber and pass through the perforations into the first chamber and thus contact the transparent member.

4. A wiper device of the class described comprising a housing having a wall arranged adjacent the transparent member to be wiped, extending inwardly into the housing, whereby an open chamber will be formed by said wall between itself and the transparent member and a second chamber will be formed by said wall and the rest of the housing, said wall having perforations therein, the central portion of the wall being of channel shape, a wiper strip having one edge held in the channel part, with the strip passing through the chamber and engaging the transparent member, a pipe extending into the second chamber, means for connecting said pipe with a supply of heated air whereby the air will enter the second chamber and pass through the perforations into the first chamber and thus contact the transparent member and baffles arranged on the perforated wall for directing the air toward the wiper strip and against the transparent member.

5. A windshield heater and wiper device comprising a housing having its rear face open, means for moving the housing over the surface to be wiped, with said rear face close to said surface, a perforated partition in the housing dividing the same into a front chamber and a rear chamber, means for introducing air into the front chamber whereby the air will pass through the perforations in the partition into the rear chamber and thus contact the surface over which the device is moving, means in the front chamber for heating the air as it passes therethrough and a wiper strip carried by the housing.

6. A wiper device comprising a housing having its rear face open, means for moving the housing over the surface to be wiped, with said rear face close to said surface, a perforated partition in the housing dividing the same into a front chamber and a rear chamber, means for introducing air into the front chamber whereby the air will pass through the perforations in the partition into the rear chamber and thus contact the surface over which the device is moving, means for heating the air and a wiper strip connected with the partition and projecting from the rear face of the device.

7. A wiper device comprising a housing having its rear face open, said housing having its sides sloping outwardly from its front to its rear, means for moving the housing over the surface to be wiped, with said rear face close to said surface, a perforated partition in the housing dividing the same into a front chamber and a rear chamber, means for introducing air into the front chamber whereby the air will pass through the perforations in the partition into the rear chamber and thus contact the surface over which the device is moving, means for heating the air and a wiper strip connected with the partition and projecting from the rear face of the device.

In testimony whereof I affix my signature.

EDWARD J. GALLAGHER, Jr.